United States Patent
Kwon (10) Patent No.: US 7,266,748 B2
(45) Date of Patent: Sep. 4, 2007

(54) METHOD AND APPARATUS FOR CORRECTING C1/PI WORD ERRORS USING ERROR LOCATIONS DETECTED BY EFM/EFM+ DECODING

(75) Inventor: Hyung-joon Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 483 days.

(21) Appl. No.: 10/824,407

(22) Filed: Apr. 14, 2004

(65) Prior Publication Data

US 2004/0194003 A1  Sep. 30, 2004

Related U.S. Application Data

(62) Division of application No. 09/765,539, filed on Jan. 19, 2001, now abandoned.

(30) Foreign Application Priority Data

Jun. 9, 2000  (KR) ............................... 2000-31663

(51) Int. Cl.
*H03M 13/29* (2006.01)
(52) U.S. Cl. ..................... 714/755; 714/756; 714/765
(58) Field of Classification Search ................ 714/755, 714/756, 765
See application file for complete search history.

(56) References Cited

U.S. PATENT DOCUMENTS

| | | | | |
|---|---|---|---|---|
| 4,764,927 A | * | 8/1988 | Izumita et al. ............... | 714/761 |
| 5,371,751 A | * | 12/1994 | Moriyama ................... | 714/762 |
| 5,392,299 A | * | 2/1995 | Rhines et al. ................. | 714/756 |
| 5,450,421 A | * | 9/1995 | Joo et al. ...................... | 714/756 |
| 5,452,310 A | * | 9/1995 | Arts ............................ | 714/781 |
| 5,696,774 A | * | 12/1997 | Inoue et al. ................. | 714/755 |
| 5,712,861 A | * | 1/1998 | Inoue et al. ................. | 714/752 |
| 5,732,093 A | * | 3/1998 | Huang ........................ | 714/765 |
| 5,920,578 A | * | 7/1999 | Zook ........................... | 714/755 |
| 6,119,261 A | * | 9/2000 | Dang et al. ................. | 714/769 |

(Continued)

FOREIGN PATENT DOCUMENTS

CN       1167981       12/1997

OTHER PUBLICATIONS

Chien-Chan Liang, Improvement of Performance in Digital Recording with Distanced Modulation Transactions on Consumer Electronics, vo. 39, No. 4, Nov. 1993.

*Primary Examiner*—Stephen M. Baker
(74) *Attorney, Agent, or Firm*—F. Chau & Associates, LLC (57) ABSTRACT

A method and system for error correcting C1/PI words using error locations detected by EFM/EFM+ decoder are provided. The method for channel decoding and error correcting includes: (a) setting up a channel code; (b) producing demodulated data including information data symbols and erasure flags by modulating channel data symbols, using the channel code; and (c) performing an error-erasure correction on the information data symbols of the demodulated data, using error locations indicated by the erasure flags. The system for channel decoding and error correcting includes a channel decoder with a channel code for producing the demodulated data having the information data symbols and the erasure flags by demodulating the channel data symbols, a memory for storing the demodulated data, and a decoding unit for performing an error-erasure correction on the information data symbols, using the error locations indicated by the erasure flags having a predetermined value.

21 Claims, 4 Drawing Sheets

U.S. PATENT DOCUMENTS

| | | | |
|---|---|---|---|
| 6,233,710 B1 * | 5/2001 | Okita | 714/784 |
| 6,292,921 B1 * | 9/2001 | Daoudi et al. | 714/784 |
| 6,378,103 B1 * | 4/2002 | Han | 714/769 |
| 6,389,573 B1 * | 5/2002 | Weng | 714/784 |
| 6,415,411 B1 * | 7/2002 | Nakamura | 714/755 |
| 6,553,533 B2 * | 4/2003 | Demura et al. | 714/769 |
| 6,907,559 B2 * | 6/2005 | Hall et al. | 714/769 |

* cited by examiner

METHOD AND APPARATUS FOR CORRECTING C1/PI WORD ERRORS USING ERROR LOCATIONS DETECTED BY EFM/EFM+ DECODING

CROSS-REFERENCE TO RELATED APPLICATIONS

The present patent application is a Divisional of U.S. patent application Ser. No. 09/765,539, filed on Jan. 19, 2001 now abandoned, and entitled "Method And Apparatus For Correcting C1/PI Word Errors Using Error Locations Detected By EFM/EFM+ Decoding", which is incorporated herein by reference in its entirety.

BACKGROUND OF THE INVENTION

1. Field of the Invention

The present invention relates to an error-erasure correction of data reproduced from an optical disc device, and more particularly, to a method and system for correcting errors and erasures in modulated channel data by indicating error locations at the time of demodulating the modulated channel data.

2. Description of the Related Art

An optical disc, such as a compact disc (CD) or digital versatile disc (DVD), is used for storing a large quantity of audio, video and/or other data information. When such information is recorded on the optical disc and read therefrom, noises can be generated. To correct errors due to the noises, in a DVD system a Reed-Solomon (R-S) product code is used as an error correction code, and an inner code (PI) of (182,172,11) and an outer code (PO) of (208,192,17) are included in the R-S product code. Here, "182" of the inner code or "208" of the outer code represents a length of a code word, that is, the number of symbols which form a code word. "172" of the inner code or "192" of the outer code represents a length of message or information of a code word, that is, the number of symbols that form the information of a code word. "11" and "17" each represent a minimum distance, called a minimum Hamming distance, of a code word.

A CD system uses a cross-interleave Reed-Solomon code (CIRC) as an error correction code. CIRC includes a C1 code of (32,28,5) and a C2 code of (28,24,5). In the C1 code or the C2 code, the first factor ("32" of the C1 code or "28" of the C2 code) represents the length of a code word, the second factor ("28" of the C1 code or "24" of the C2 code) represents the length of information of a code word, and the last factor, "5", represents the minimum distance of a code word.

There is a limit to the correction of the inner code (PI) and the outer code (PO) of a R-S product code and the C1 and C2 codes of a CIRC code. The correction limit is determined by the minimum distance of a code word. For example, if the number of errors in a code word is defined as "e", the number of erasures in the same code word as "v", and the minimum distance of the code word as "d", an error correction using the R-S product code for a DVD system or the CIRC code for a CD system can correct errors of the code word only if Equation 1 is satisfied.

$$2e+v<\text{Minimum Distance} \quad (1)$$

Here, 'error' means that neither an error value nor an error location is known, and 'erasure' means that an error value is not known but an error location is known. The error value is determined by the difference between an original symbol value and an erroneous symbol value corresponding to the original symbol. The 'error location' is the location of an erroneous symbol. The 'erroneous symbol' means that an original symbol is damaged by noises produced by data processing such as recording and reproducing.

Table 1 is a summary of characteristics of a R-S product code and a CIRC code used in CD and DVD systems, respectively.

TABLE 1

| Code | Format | Minimum Distance | Correctable Error Number | Correctable Erasure Number |
|---|---|---|---|---|
| CD C1 Code | (32, 28, 5) | 5 | 2 | 4 |
| CD C2 Code | (28, 24, 5) | 5 | 2 | 4 |
| DVD PI Code | (182, 172, 11) | 11 | 5 | 10 |
| DVD PO Code | (208, 192, 17) | 17 | 8 | 16 |

Both the C1 code and C2 code have the minimum distance of "5", so that with respect to the C1 and C2 codes, it is possible to correct up to two (2) errors or four (4) erasures per each code word. If there are errors and erasures together in a code word, it is possible to correct up to one (1) error and two (2) erasures.

The PI code has the minimum distance of "11", so that it is possible to correct up to five (5) errors or ten (10) erasures in a PI code word. The PO code has the minimum distance of "17", so that it is possible to correct up to eight (8) errors or sixteen (16) erasures in a PO code word.

The CD or DVD system uses a slicer to change an analog signal read from a CD or DVD into digital data. A conventional slicer changes an input sample signal into a binary number such as "1" (or logic high state) or "0" (or logic low state) using high and low threshold values between the two logic states. In other words, a conventional slicer uses a "soft decision method" in which if an input sample signal is smaller than the low threshold value, it outputs "0", if the input sample signal is bigger than the high threshold value, it outputs "1", and if the input sample signal is between the high and low threshold values, it outputs an "erasure." Since the slicer outputs 14 bits (in the case of the CD) or 16 bits (in the case of the DVD) data to form one symbol, use of the soft decision method in the slicer causes an increase in the number of the erasures. As a result, the actual efficiency of the error correction is lowered.

For these reasons, a C1 decoder or a PI decoder in a error correction system does not use the erasure correction in the error correction of a C1 word or a PI word. An erasure flag can be obtained from the result of the error correction of the C1 or PI word in the C1 or PI decoder. A C2 decoder or a PO decoder uses the erasure flag in the erasure correction of a C2 word or a PO word. This is because the entire error correction efficiency is higher when the C2 or PO word is used for the erasure correction than when the C2 or PO word is used for the error correction.

In a conventional error correction system, therefore, it is possible to error-correct up to 2 erroneous symbols per each code word for a C1 code, and it is possible to erasure-correct up to 4 erroneous symbols per each code word for a C2 code. Similarly, it is possible to error-correct up to 5 erroneous symbols per each code word for a PI code, and it is possible to erasure-correct up to 16 erroneous symbols per each code word for a PO code.

However, for high speed optical devices such as a high speed CD-ROM and a high speed DVD-ROM, high speed data processing is required when restoring data from such media. The incidence of errors in a high speed data processing is higher than the incidence of errors in a low speed data processing.

Therefore, a need exists for an error correction system which is more efficient and effective in the error correction than a conventional error correction system in a high speed as well as a low speed data processing.

SUMMARY OF THE INVENTION

Accordingly, to solve the above and other problems, it is an object of the present invention to provide a method for performing more effective error correction by indicating error locations and for performing error-erasure correction on code words in which error locations are indicated at the time of demodulating modulated data reproduced from an optical disc.

It is the other object of the present invention to provide a system for more effectively correcting errors and erasures in the code words in which error locations are indicated at the time of demodulating modulated data reproduced from an optical disc.

To achieve the above and other objects, a method for channel-decoding and error-correcting modulated data reproduced from an optical disc according to the present invention includes: (a) determining a channel code including channel data patterns that channel data symbols can have, and channel data symbols that correspond individually to the channel data patterns; (b) producing demodulated data including information data symbols and erasure flags by demodulating the channel data symbols, using the determined channel code; and (c) performing an error-erasure correction (that is, correction of erasures and then errors of unknown location) on the information data symbols produced in the step (b), using error locations indicated by the erasure flags having a predetermined value. Preferably, the step (b) includes: (b1) outputting the information data symbols if the channel code has the information data symbols corresponding to the channel data symbols; and (b2) outputting erasure symbols as the above information data symbols and setting the erasure flags to the predetermined value if the channel code has no information data symbols corresponding to the channel data symbols.

To achieve other objects of the present invention, a system for channel decoding and error correcting modulated data reproduced from an optical disc includes: a channel code including channel data patterns which can have channel data symbols and the information data symbols corresponding to the channel data patterns individually; a channel decoder producing demodulated data including the information data symbols and the erasure flags by demodulating the channel data symbols, using the channel code; a memory storing the demodulated data outputted from the channel decoder; and a decoding unit for performing an error-erasure correction on the information data symbols, using error locations indicated by the erasure flags having a predetermined value. In the system, if information data symbols corresponding to the channel data patterns exist in the channel code, the channel decoder outputs the corresponding information data symbols as the information data symbols. If information data symbols corresponding to the channel data patterns do not exist in the above channel code, the channel decoder outputs the erasure symbols as the information data symbols, and sets the erasure flags to the predetermined value.

BRIEF DESCRIPTION OF THE DRAWINGS

The above and other objects and advantages of the present invention will become more apparent by describing in detail a preferred embodiment thereof with reference to the attached drawings in which.

DETAILED DESCRIPTION OF PREFERRED EMBODIMENTS

Before describing the preferred embodiments of the present invention, a conventional system for error correcting used in a CD system will be described with reference to FIG. 1.

Figure 1:
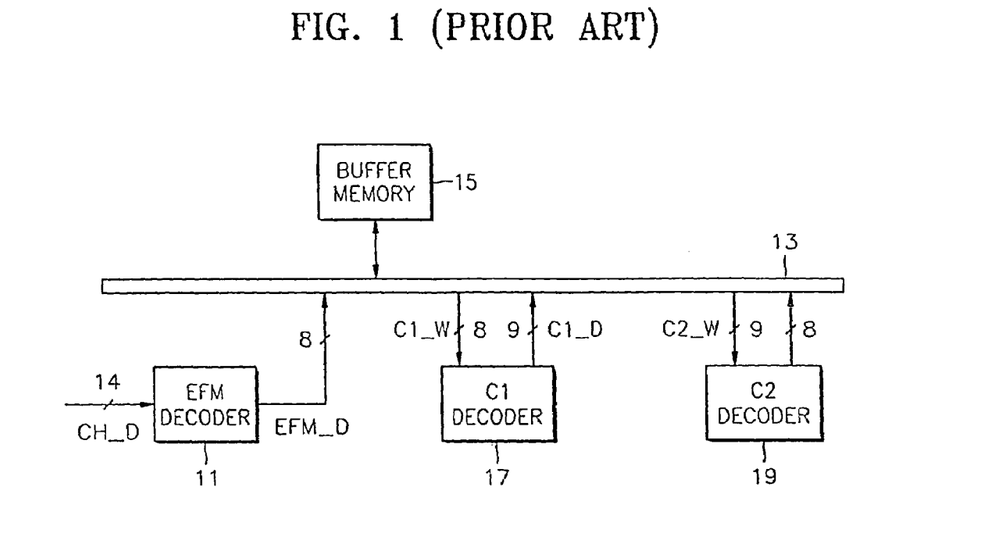
FIG. 1 is a circuit diagram illustrating a conventional system for channel decoding and error correcting.

In FIG. 1, an EFM decoder 11 receives EFM modulated channel data reproduced from a CD, and has an EFM code in the form of an internal lookup table. The EFM code defines 256 channel data patterns that channel data symbols (CH_D) can have, and 8-bit information data symbols that corresponds to the channel data patterns individually. If there is a channel data pattern corresponding to a 14-bit channel data symbol (CH_D) of the EFM modulated channel data, the EFM decoder 11 chooses an 8-bit information data symbol corresponding to the channel data pattern as an EFM demodulated data symbol (EFM_D).

If there is no channel data pattern corresponding to the channel data symbol (CH_D) in the EFM code, the EFM decoder 11 chooses any information data symbol within the EFM code as the EFM demodulated data symbol (EFM_D), or chooses a predetermined information data symbol within the EFM code, for example, "OxFF." Therefore, all channel data symbols (CH_D) each having no corresponding channel data pattern will appear as errors in a subsequent error correction process.

The EFM decoder 11 provides 8-bit EFM demodulated data symbols (EFM_D), that is, the information data symbols, to a buffer memory 15 through a bus 13. The buffer memory 15 stores information data symbols provided from the EFM decoder 11. The buffer memory 15 provides a C1 word (C1_W), formed of even-numbered information data symbols of a frame having 32 information data symbols and odd-numbered information data symbols of the next frame, to a C1 decoder 17 through the bus 13.

The C1 decoder 17 which receives the C1 word (C1_W) performs an error correction on the received C1 word (C1_W), using 4 P-parity symbols included in the C1 word (C1_W). Therefore, the C1 decoder 17 can correct one erroneous information data symbol per code word formed of 28 information data symbols. If there are two (2) or more erroneous information data symbols in one code word, the C1 decoder 17 attaches erasure flags to the code word. Accordingly, for example, the erasure flags each having a value of "1" are attached to all information data symbols forming the code word. As a result, the C1 decoder 17 produces 9-bit data symbols (C1_D) each including an 8-bit information data symbol and an 1-bit erasure flag, and the 9-bit data symbols (C1_D) are provided to the buffer memory 15.

The buffer memory 15 performs a convolutional de-interleaving process on the data symbols (C1_D) received from the C1 decoder 17. In the convolutional de-interleaving process, each of the 28 data symbols (C1_D) of one code word is delayed by a different time period, so that a C2 word (C2_W), formed of 28 data symbols (C1_D) obtained one by one from each of 28 code words, is produced. The convolutional de-interleaving process in the buffer memory 15 disperses the data symbols (C1_D) of the code word to which the erasure flags are attached by the C1 decoder 17, into 28 C2 words (C2_W).

Then, the 9-bit data symbols (C1_D) forming a C2 word (C2_W) are transmitted to a C2 decoder 19 through the bus 13. Here, the C2 word (C2_W) provided from the buffer memory 15 to the C2 decoder 19 includes 28 data symbols (C1_D), and each data symbol (C1_D) includes an information data symbol and an 1-bit erasure flag.

The C2 decoder 19 decides whether each of the information data symbols of a C2 word is an erasure symbol based on a corresponding erasure flag. If the information data symbols are erasure symbols, the C2 decoder 19 performs an erasure correction with respect to the information data symbols (i.e., the erasure symbols).

Upon performing the erasure correction, 8-bit information data symbols are outputted from the C2 decoder 19 and provided to the buffer memory 15 where the information data symbols are de-interleaved. This completes the CIRC decoding by the apparatus for error correcting shown in FIG. 1.

A method and/or system of error correcting for a DVD system is similar to the method and/or system above described in reference to FIG. 1. The difference between a CD system and a DVD system is that the DVD system uses a 8 to 16 modulated code (EFM+ code) as a channel code, and uses a PI code and a PO code for error correcting instead of the C1 code and the C2 code. The EFM+ modulated data is error-corrected by a PI decoder, and the data error-corrected by the PI decoder is erasure-corrected by a PO decoder.

In a decoding process using the CIRC code or the R-S product code, if an error location within a code word can be known, the code word can be erasure-corrected. Thus, in this case, more erasures than the number of correctable errors can be corrected. Therefore, it is desirable to know the error location within a code word in order to increase the error correction efficiency using the CIRC code and the R-S product code.

A basic concept of the present invention is using the C1 code or the PI code for correcting erasures, using the characteristics that the channel data symbols which do not have the corresponding channel data patterns in the channel code are erroneous symbols. The error patterns which can be produced while recording and reproducing data in a CD/DVD are analyzed as follows:

Case 1: there are no channel data patterns corresponding to the EFM/EFM+ modulated channel data symbols within the EFM/EFM+ code.

Case 2: there are corresponding channel data patterns within the EFM/EFM+ code even though the EFM/EFM+ modulated channel data symbols are changed by noises.

In Case 1, it can be decided that there are errors in the channel code demodulated information data symbols before starting the error correction, so that it is possible to indicate the error location within a code word. On the other hand, in Case 2, it cannot be known whether there are errors in the demodulated information data symbols and the error location before the error correction is finished. Accordingly, if the conventional error correction method is simply performed on both Case 1 and Case 2, it is only possible to correct 2 errors in the case of a CD and 5 errors in the case of a DVD. If there are more errors than that, it is not possible to correct the errors.

In the application of a high speed CD-ROM/DVD-ROM which requires high speed operation, the incidence of errors occurring when data is restored from an optical disc is higher in the high speed operation than in a low speed operation. In other words, under the circumstances such as the high speed operation, channel data symbols having no corresponding channel data patterns in the EFM/EFM+ code are frequently produced. In this case, C1 decoding cannot correct 3 or more errors on a C1 word, PI decoding cannot correct 6 or more errors on a PI word. Consequentially, many code words that cannot be corrected are produced. However, if the Cases 1 and 2 are treated differently, the error correction efficiency can be increased.

According to the present invention, an error of Case 1 is considered as an erasure since an error location (i.e., a location of the error) can be known, while an error of Case 2 is considered as an error since error value and location are not known. In this case, the erasure correction can be performed on the C1 word and PI word. In other words, the C1/PI decoder can perform the erasure correction as well as the error correction with respect to a C1/PI word. As a result, the error correction where the C1/PI decoder performs both the error correction and the erasure correction is more efficient and effective than the error correction where the C1/PI decoder performs only the error correction. In addition, since the incidence of Case 1 is higher than that of Case 2, the entire error correction becomes further efficient.

Figure 2:
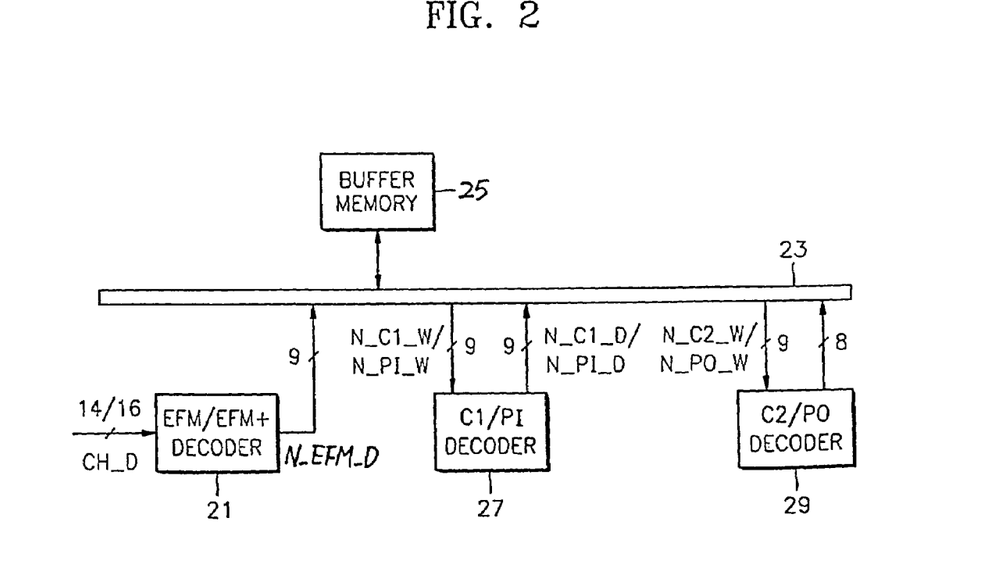
FIG. 2 is a circuit diagram illustrating a system for channel decoding and error correcting according to a preferred embodiment of the present invention.

FIG. 2 shows a system for channel decoding and error correcting according to a preferred embodiment of the present invention. The system for channel decoding and error correcting includes a channel decoder 21, a bus 23, a buffer memory 25, and means for error correcting 27, 29.

The system of FIG. 2 can be realized as a system for channel decoding and error correcting only for the CD, only for the DVD, or for a combined use of the CD and DVD. Therefore, to avoid redundancy, the system for a combined use of the CD and DVD will be described. The system in FIG. 2 uses the EFM code and the CIRC code for the CD, and uses the EFM+ code and the R-S product code for the DVD. Accordingly, the channel decoder 21 is preferably an EFM/EFM+ decoder. Hereinafter, the channel decoder 21 is called the EFM/EFM+ decoder.

The EFM/EFM+ decoder 21 has a channel code in the form of an internal lookup table. The channel code includes an EFM code which is used for the CD and an EFM+ code which is used for the DVD. In the case of use for the CD, the EFM/EFM+ decoder 21 outputs 9-bit demodulated data (N_EFM_D) by EFM demodulating 14-bit channel data symbol (CH_D) reproduced from the CD. Preferably, the 9-bit demodulated data (N_EFM_D) is formed of 8-bit EFM demodulated information data symbol (INF) and 1-bit first erasure flag (FLAG1). The EFM demodulated information data symbols (INF) can have 256 patterns. Therefore, 14-bit channel data symbols (CH_D) also have only 256 channel data patterns. If there is no channel data pattern corresponding to a 14-bit channel data symbol (CH_D), the EFM/EFM+ decoder 21 outputs an erasure symbol as an information data symbol (INF) corresponding to the channel data symbol (CH_D).

If the EFM code is used as the channel code, the erasure symbol is chosen from the channel code or is a predetermined information data symbol (INF), for example "0xFF", present in the channel code.

In the case of the DVD, the EFM/EFM+ decoder 21 demodulates 16-bit channel data symbols (CH_D) reproduced from a DVD, and outputs the 9-bit demodulated data (N_EFM_D). Preferably, the 9-bit demodulated data (N_EFM_D) is formed of an 8-bit EFM+ demodulated information data symbol (INF) and an 1-bit first erasure flag (FLAG1). In the case of the EFM+ code, the EFM+ demodulated information data symbols (INF) can have 256 patterns. Therefore, the 16-bit channel data symbols (CH_D) also have only 256 channel data patterns. If there is no channel data pattern corresponding to a 16-bit channel data symbol (CH_D), the EFM/EFM+ decoder 21 outputs an erasure symbol as an information data symbol (INF) corresponding to the channel data symbol (CH_D). Preferably, if the EFM+ code is used as the channel code, the erasure symbol is a predetermined information data symbol (INF) present in the channel code, for example, "0xFF." All the information data symbols (INF) within the EFM+ code, except for the specific information data symbols (INF) which are considered errorless during correction of errors, can be used as the erasure symbols.

Figure 3A:
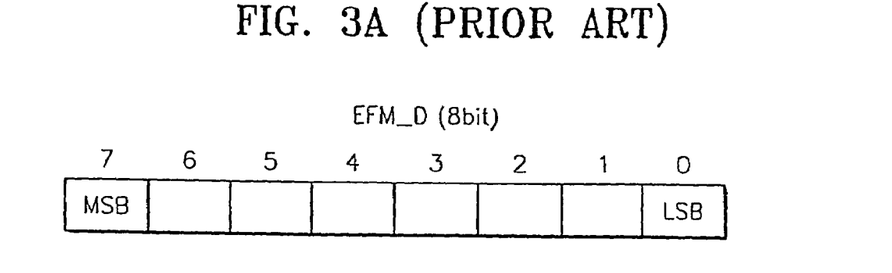
FIG. 3 shows the differences between demodulated data in the conventional system in FIG. 1 and in the system of the present invention in FIG. 2.
Figure 3B:
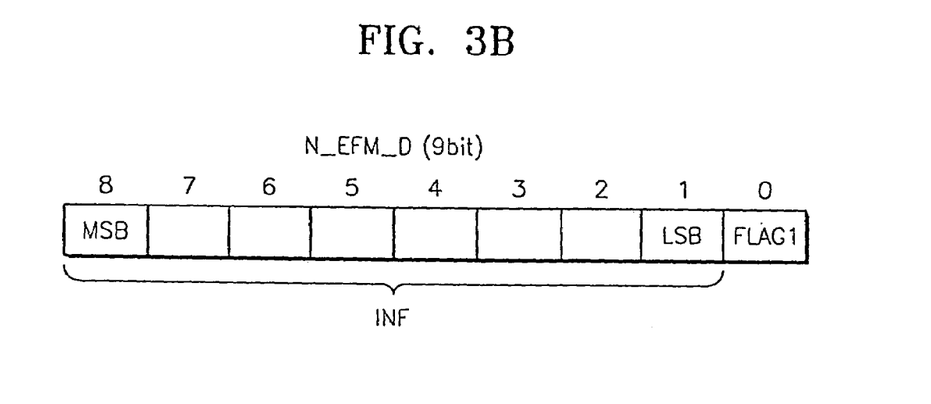

To differentiate the erasure symbols from the information data symbols (INF) obtained by demodulating the channel data symbols (CH_D) of which corresponding channel data patterns exist in the channel code, the EFM/EFM+ decoder 21 sets the first erasure flag (FLAG1) as a prescribed value, for example, "1", and attaches it to the information data symbols (INF). As a result, the demodulated data (N_EFM_D) which is output from the channel decoder 21 is formed of the 8-bit information data symbols (INF) obtained from the channel code and the 1-bit first erasure flag (FLAG1). FIG. 3 shows the difference between the output (FIG. 3(a)) of the EFM decoder 11 shown in FIG. 1 and the output (FIG. 3(b)) of the EFM/EFM+ decoder 21 according to the present invention.

The buffer memory 25 performs a similar operation to the buffer memory 15 of FIG. 1. A C1 word or a PI word (N_C1_W/N_PI_W) is obtained from the buffer memory 25 by performing the substantially same operation as the C1 word (C1_W) is obtained from the buffer memory 15 in FIG. 1. The C1 or PI word (N_C1_W/N_PI_W) is provided to the C1/PI decoder 27. The C1 or PI word (N_C1_W/N_PI_W) includes the demodulated data (N_EFM_D) formed of the 8-bit information data symbols (INF) and the 1-bit first erasure flag (FLAG1).

Figure 4:
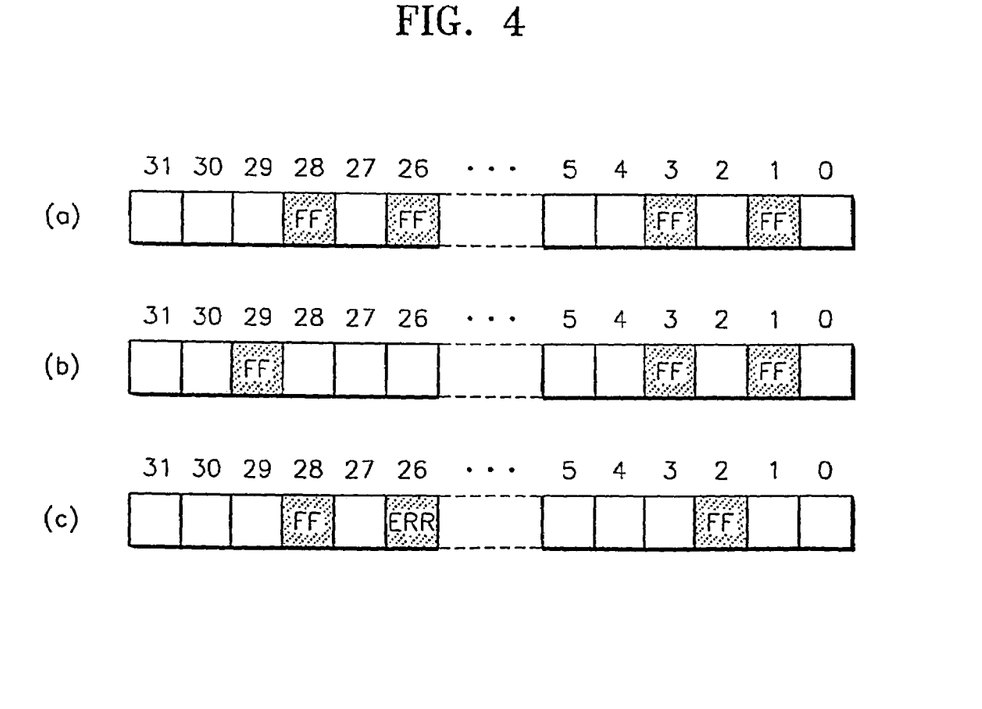
FIG. 4 shows examples of the C1 word on which the system of the present invention in FIG. 2 performs error-erasure correction.

The C1/PI decoder 27, which receives the C1/PI word (N_C1_W/N_PI_W), determines the information data symbols (INF) associated with the first erasure flag (FLAG1) of which the value is 1 to be the erasure symbols. After the erasure correction is performed on the erasure symbols, the error correction is performed on the entire set of information data symbols forming the C1/PI word (N_C1_W/N_PI_W). Therefore, the C1/PI decoder 27 can correct up to 4 erasure symbols on the C1 word (N_C1_W), up to 2 erasure symbols and one erroneous information data symbol, or up to 2 erroneous information data symbols. FIG. 4 shows examples of the C1 word (N_C1_W) on which the C1/PI decoder 27 in FIG. 2 performs an erasure correction. In FIG. 4, a quadrangle indicated as "FF" means the demodulated data (N_EFM_D) to which the first erasure flag is attached for indicating the erasure location, and a quadrangle indicated as "ERR" means the demodulated data (N_EFM_D) for which it cannot be known at this stage whether it is an error or not. FIG. 4(a) is the case in which there are 4 known erasure locations (FF) among the 32 demodulated data (N_EFM_D), and FIG. 4(b) is the case in which there are 3 known erasure locations (FF). FIG. 4(c) is the case in which there are 2 known erasure locations (FF) and one error location of the demodulated data (ERR) is not known even though it is an actual error. Here, the actual error means that even though an error is produced, there is a channel data pattern that is matched to the EFM code.

In the case of FIG. 4(c), if the conventional 2 error corrections are performed, error correction becomes impossible, but it is possible to correct errors using the erasure correction. The C1/PI decoder 27 can correct up to 5 erroneous information data symbols or 10 erasure symbols on the PI word (N_PI_W) in which errors and erasures are mixed up.

Figure 5:
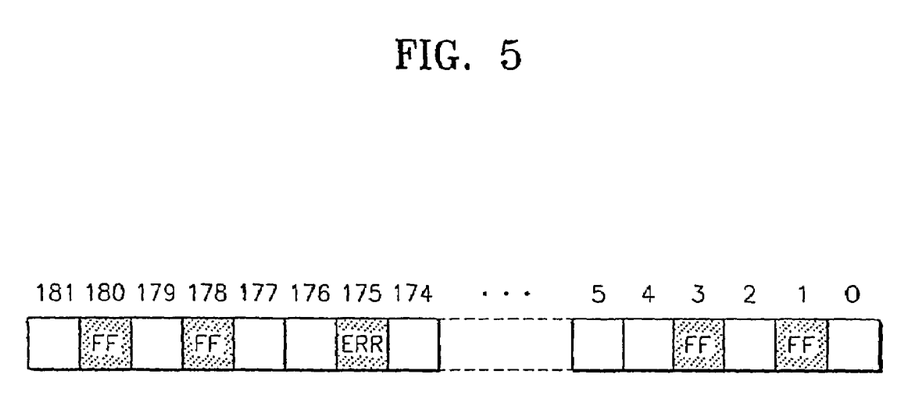
FIG. 5 shows an example of a PI word on which the system of the present invention in FIG. 2 performs error-erasure correction.

FIG. 5 shows an example of the PI word (N_PI_W) on which the C1/PI decoder 27 in FIG. 2 performs the error correction. The PI word (N_PI_W) in FIG. 5 is formed of 182 information data symbols (INF), in which four (4) are erasures (FF) and one is erroneous information data symbol (ERR) which is an actual error but the error location is not known. When the errors and erasures are mixed up in the PI word (N_PI_W), the error number and the erasure number which the C1/PI decoder can correct at the same time are shown in the following table 2.

TABLE 2

| Error Number | Correctable Erasure Number |
|---|---|
| 0 | 10 or less |
| 1 | 8 or less |
| 2 | 6 or less |
| 3 | 4 or less |
| 4 | 2 or less |
| 5 | 0 or less |

In the case of PI code, the correction capability of the code is relatively high compared to that of the C1 code used for the CD, so that a higher error correction efficiency can be obtained.

Like the C1 decoder 17 in FIG. 1, if 2 or more erroneous information data symbols exist in one C1 word (N_C1_W), or 6 or more in one PI word (N_PI_W), the C1/PI decoder 27 attaches the second erasure flags (FLAG2) to the code word. Therefore, the second erasure flags (FLAG2), for example, having a value of 1, are attached to all the information data symbols (INF) forming the code word.

The 9-bit data symbols (N_C1_D/N_PI_D) including the 8-bit information data symbols (INF) and the 1-bit second erasure flag (FLAG2) are provided to the buffer memory 25. The buffer memory 25 performs the de-interleaving on the data symbols (N_C1_D/N_PI_D) received from the C1/PI decoder 27. The buffer memory 25 performs the convolutional de-interleaving in the case of use for the CD. In the case of use for the DVD, the buffer memory 25 performs the de-interleaving and forms the PO word (N_PO_W) formed of 208 9-bit data symbols.

The C2/PO decoder 29 in FIG. 2 corrects errors on the C2 word or the PO word (N_C2_W/N_PO_W) provided from the buffer memory 25. The error correction by the C2/PO decoder 29 includes the erasure correction and it is same as explained in FIG. 1.

As mentioned above, the error correction can be performed more effectively by indicating the error location during the demodulation of the modulated data using the channel code, and then error-erasure correcting the error location indicated in the code words.

The phrase "error-erasure correction" as used herein shall be understood to comprise the decoding step of determining if there are any erasures for which the locations are known so that they may be efficiently corrected prior to performing any correction of errors for which the locations are unknown. Errors for which the locations are unknown are herein referred to as "actual errors" in order to differentiate them from erasures. This usage may be more specific than other usage of the term in the art.

Figure 6:
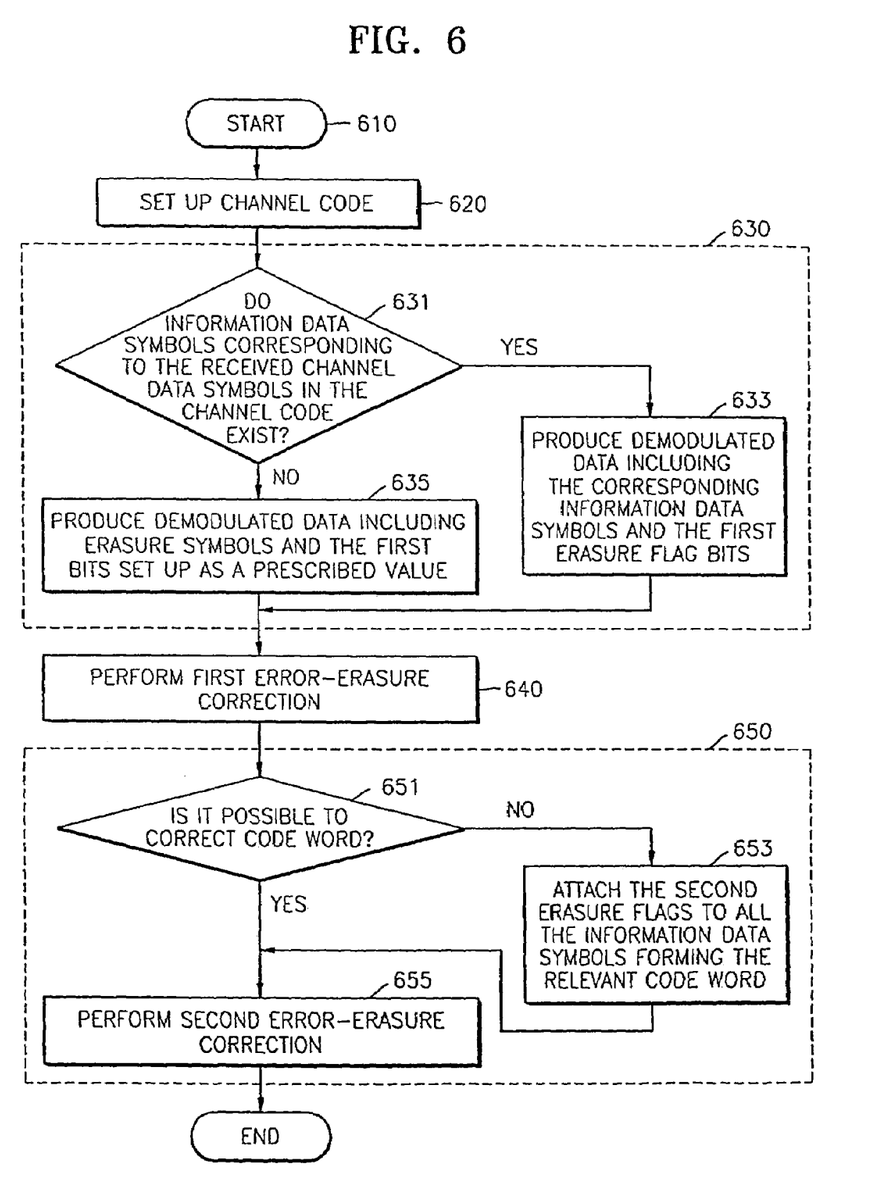
FIG. 6 is a flowchart illustrating a method for channel decoding and error correcting according to a preferred embodiment of the present invention.

FIG. 6 is a flowchart showing the method for channel decoding and error correcting according to a preferred embodiment of the present invention. The method for channel decoding and error correcting may be applied to the system in FIG. 2.

A start block initializes routine execution (610). First, a channel code is set up (620). The channel code includes the channel data patterns which the channel data symbols (CH_D) can have, and the information data symbols (INF) that correspond individually to the channel data patterns. It is preferable that the channel code is set up previously in the form of a look-up table in a channel decoder. For the channel decoder, the EFM code is used for the CD, and the EFM+ code is used for the DVD.

Second, the demodulated data (N_EFM_D) including the information data symbols (INF) and the first erasure flag (FLAG1) is produced by demodulating the received channel data symbols (CH_D) (630) using the set-up channel code. The demodulated data (N_EFM_D) is preferably formed of the EFM/EFM+ demodulated 8-bit information data symbols (INF) and the 1-bit first erasure flag (FLAG1). This process (630) can be divided into the following detail processes.

First of all, it is determined whether the information data symbols (INF) corresponding to the received channel data symbols (CH_D) exist in the channel code (631). If the information data symbols (INF) corresponding to the received channel data symbols (CH_D) exist in the channel code, the corresponding information data symbols are output as the information data symbols (INF) of the demodulated data (N_EFM_D) (633). If the information data symbols (INF) corresponding to the received channel data symbols (CH_D) do not exist in the channel code, the erasure symbols are output as the information data symbols (INF), and the first erasure flag (FLAG1) is set to a predetermined value, for example, "1" (635). The erasure symbol may be chosen arbitrarily from the channel code or a predetermined information data symbol (INF) present within the channel code, for example, "0xFF."

Third, the first error-erasure correction is performed (640). The first error-erasure correction is performed in the C1 decoding for the CD and in the PI decoding for the DVD. In this process (640), the information data symbols (INF) corresponding to the first erasure flag (FLAG1) of the value 1 are judged as the erasure symbols, and after performing the erasure correction on the erasure symbols, the error correction is performed on the entire information data symbols forming one code word.

Last, the second error-erasure correction is performed (650). This process (650) can be divided into the following detail processes. First of all, it is determined whether it is possible to correct the code word obtained from the first error-erasure correction performed in the above process 640 (651). If it is not possible to correct the code word, it means that there are more errors in the code word than the number of correctable errors. For example, this is a case in which there are two or more erroneous information data symbols in one C1 word (N_C1_W), or 6 or more erroneous information data symbols in the PI word (N_PI_W).

If it is not possible to correct the code word, the second erasure flags (FLAG2) are attached to the relevant code word (653). Therefore, the second erasure flags (FLAG2), for example, having a value of 1, are attached to all the information data symbols (INF) forming the code word. Preferably, the de-interleaving is performed on the 9-bit data symbols including the 8-bit information data symbols and the 1-bit second erasure flag (FLAG2). Then, the second error-erasure correction is performed (655). The second error-erasure correction is performed using the second erasure flags in the C2 decoding for the CD, and in the PO decoding for the DVD.

To summarize a CD embodiment of the present invention, an EFM demodulator receives channel code symbols and demodulates each valid channel code symbol to an information data symbol. For each invalid channel code symbol, the EFM demodulator provides an arbitrary information data symbol or one that is also an erasure symbol, and further sets a first single-bit erasure flag for each invalid channel code symbol. The information data symbols and corresponding first erasure flags are sent to a buffer.

The buffer assembles a C1 word including information data symbols and their corresponding first erasure flags, and provides this C1 word to a C1 decoder. The novel C1 data decoder of the present invention begins by checking for erasures using the first single-bit erasure flags of the current C1 word, which may be efficiently OR'ed together, as will be readily understood by those skilled in the art for such single-bit flags, to quickly determine if there are any erasures. If there are any erasures in the current C1 word, the C1 decoder proceeds to correct a correctable number of erasures. The C1 decoder then corrects a correctable number of actual errors, where the correctable number of actual errors is dependent upon the number of erasures, that is, it is reduced by one correctable actual error for every two erasures corrected.

If, on the other hand, there are no first erasure flags set for the current C1 word, only then does the C1 decoder of the present invention proceed along more conventional lines to correct only actual errors of the current C1 word. If the number of erasures and/or actual errors is too great for the C1 decoder to handle, this C1 decoder sets each information data symbol of the current C1 word to an arbitrary information data symbol or one that is also an erasure symbol, and further sets a second erasure flag for each symbol of the current C1 word. The information data symbols and their corresponding second erasure flags are provided to the buffer.

The buffer uses the symbols and second erasure flags provided by the C1 decoder to assemble a C2 word including information data symbols and their corresponding second erasure flags, and provides the C2 word to a C2 decoder. The C2 decoder of the present invention begins by correcting a correctable number of erasures, and then corrects a correctable number of actual errors, where the correctable number of actual errors is dependent upon the number of erasures. If the number of erasures and/or actual errors is too great for the C2 decoder to handle, this C2 decoder sets each information data symbol of the current C2 word to an arbitrary information data symbol or one that is also an erasure symbol. The information data symbols are provided to the buffer.

Thus, exemplary embodiments of the present disclosure flag and correct erasures of information data symbols with the first decoder (e.g., C1 or PI) prior to correcting any actual errors. An advantageous feature is the correction of erasures prior to the correction of actual errors, and particularly the correction of erasures with the first or same decoder to be subsequently used for the correction of actual errors.

Another advantage is that a greater benefit can now be provided (i.e., erasure and error correction at each decoder) with a reduced processing overhead (e.g., single-bit OR'able erasure flags). Yet another advantage is using a mere 1-bit flag to mark the symbol location of an 8-bit information data symbol erasure, which may be used by the first decoder to perform erasure correction, where applicable, prior to using the same decoder to perform actual error correction.

A further advantage is that erasure flags are used directly for correcting erasures, and that embodiments may also use erasure information in conjunction with other information for correcting actual errors. Thus, the erasure flags are used for correcting erasures, and they may also be used for correcting actual errors.

Having described the preferred embodiments of the system and method for channel decoding and error correcting according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A system for error-erasure correcting modulated data reproduced from an optical disc, the system comprising:
   a demodulator for receiving channel code symbols and demodulating each valid channel code symbol into an information data symbol, providing an arbitrary information data symbol for each invalid channel code symbol, and setting a first single-bit erasure flag for each invalid channel code symbol;
   a first buffer in signal communication with the demodulator for receiving the information data symbols and corresponding first erasure flags, and composing a first code word including a plurality of information data symbols and their corresponding first erasure flags; and
   a first error-erasure decoder in signal communication with the first buffer for receiving the first code word, checking for erasures by performing a single-bit operation on all of the first single-bit erasure flags of the received first code word, and if any erasures are detected, correcting up to a first maximum number of correctable erasures and then correcting a number of actual errors not to exceed one half of the first maximum number of correctable erasures reduced by one half of the number of corrected erasures, and if no erasures are detected, correcting only actual errors of the first code word.

2. A system as defined in claim 1 wherein, if the original number of erasures indicated by the first single-bit erasure flags of the first code word exceeds the first maximum number of correctable erasures, the first error-erasure decoder sets a corresponding second single-bit erasure flag for each uncorrected erasure, and if the number of post-erasure-correction actual errors exceeds one half of the first maximum number of correctable erasures reduced by one half of the number of corrected erasures, the first error-erasure decoder sets the second single-bit erasure flag for each information data symbol of the first code word.

3. A system as defined in claim 2, further comprising
   a second buffer in signal communication with the first error-erasure decoder for receiving the information data symbols of the first code word along with their corresponding second single-bit erasure flags from the first error-erasure decoder and composing a second code word including a plurality of information data symbols and their corresponding second single-bit erasure flags; and
   a second error-erasure decoder in signal communication with the second buffer for receiving the second code word, checking for erasures by performing a single-bit operation on all of the second single-bit erasure flags of the received second code word, and if any erasures are detected, correcting up to a second maximum number of correctable erasures and then correcting a number of actual errors not to exceed and half of the second maximum number of correctable erasures reduced by one half of the number of corrected erasures, and if no erasures are detected, correcting only actual errors of the second code word.

4. A system as defined in claim 3 wherein, if the number of erasures indicated by the second single-bit erasure flags of the second code word exceeds the second maximum number of correctable erasures, the second error-erasure decoder sets the information data symbol of the second code word to an erasure symbol for each uncorrected erasure, and if the number of post-erasure-correction actual errors exceeds one half of the second maximum number of correctable erasures reduced by one half of the number of erasures corrected by the second error-erasure decoder, the second error-erasure decoder sets each information data symbol of the second code word to an erasure symbol.

5. A system for channel decoding and error-correcting modulated data reproduced from an optical disc, the system comprising means for:
   (a) setting a channel code including channel data patterns of channel data symbols and information data symbols that correspond to respective channel data patterns;
   (b) producing demodulated data including the information data symbols and erasure flags by demodulating the channel data symbols, using the channel code; and
   (c) performing correction of erasures and then errors of unknown location on the information data symbols produced in the step (b), using erasure locations indicated by the erasure flags having a predetermined value,
   wherein the step (b) of producing demodulated data compiles the steps of
   (b1) outputting the information data symbols if the channel code has the information data symbols corresponding to the channel data patterns; and
   (b2) outputting erasure symbols as the information data symbols and setting the erasure flags to the predetermined value if the channel code has no information data symbols corresponding to the channel data patterns.

6. A system as defined in claim 5 wherein each of the erasure symbols is one of the information data symbols in the channel code or a predetermined value.

7. A system as defined in claim 5 wherein the means for performing correction comprises a first decoder for performing correction of erasures of known location and the first or same decoder for subsequently performing correction of other or actual errors of unknown location.

8. A system as defined in claim 5 wherein the channel code is one of an EFM code and an EFM+ code.

9. A system as defined in claim 8 wherein the demodulated data includes 8-bit information data symbols and 1-bit erasure flags.

10. A system for channel decoding and error correcting modulated data reproduced from an optical disc, the system comprising:
a channel decoder, including a channel code having channel data patterns that channel data symbols can have and information data symbols which correspond individually to the channel data patterns, and for producing demodulated data having the information data symbols and erasure flags by demodulating the channel data symbols, using the channel code.
a memory for storing the demodulated data outputted from the channel decoder; and
a decoding unit for performing correction of erasures and then errors of unknown location on the information data symbols, using error locations indicated by the erasure flags having a predetermined value,
wherein the channel decoder outputs the information data symbols if the channel code has the information data symbols corresponding to the channel data patterns, and the channel decoder outputs erasure symbols as the information symbols and sets the erasure flags to the predetermined value if the channel code has no information data symbols corresponding to the channel data patterns.

11. A system as defined in claim 10 wherein each of the erasure symbols is one of the information data symbols in the channel code or a predetermined value.

12. A system as defined in claim 10 wherein the channel code is one of an EFM code and an EFM+ code.

13. A system as defined in claim 12 wherein the demodulated data includes 8-bit information data symbols and the 1-bit erasure flags.

14. A system as defined in claim 10 wherein the decoding unit includes:
a means for receiving from the memory code words obtained from the demodulated data;
a means for detecting a code word having more than a predetermined number of errors; and
a means for providing second erasure flags of a predetermined value to information data symbols of the detected code word.

15. A system as defined in claim 14 wherein the predetermined number is two (2) for a compact disc (CD) system or five (5) for a digital versatile disc (DVD) system.

16. A system as defined in claim 14, further compiling:
a means for deinterleaving data from the decoding unit to generate deinterleaved code words containing the information data symbols and the second erasure flags; and
a second decoding unit for performing correction of erasures and then errors of unknown location on the information data symbols of the deinterleaved code words using the second erasure flags.

17. A system for correcting errors and erasures in modulated channel data reproduced from an optical disc, the system comprising means for:
providing a channel code having channel data patterns of the modulated channel data and information data symbols corresponding to the channel data patterns, respectively;
comparing channel data symbols of the modulated channel data with the channel data patterns in the channel code;
producing information data symbols corresponding to channel data patterns of the channel data symbols to form demodulated data;
producing erasure symbols with erasure flags to form the demodulated data when the channel code has no channel data patterns matching the channel data symbols;
providing code words obtained from the demodulated data; and
correcting erasures and then actual errors in the code words using the erasure flags.

18. A system as defined in claim 17 wherein the channel code is an EFM code for a compact disc (CD) system and an EFM+ code for a digital versatile disc (DVD) system.

19. A system as defined in claim 17, further comprising:
detecting a code word having more than a predetermined number of errors; and
providing second erasure flags of a predetermined value to the detected code word.

20. A system as defined in claim 19 wherein the second erasure flags are provided to the detected code word such that each of the second erasure flags is attached to each of information data symbols or erasure symbols of the detected code word.

21. A system as defined in claim 19 further comprising:
deinterleaving the code words on which the correcting step has been performed; and
correcting errors and erasures in the deinterleaved code words by locating defective symbols using the second erasure flags.

* * * * *